(No Model.)

S. W. WRIGHT.
NUT LOCK.

No. 517,534.  Patented Apr. 3, 1894.

WITNESSES:
M. W. Twitchell
May E. Moore

INVENTOR:
Syrus W. Wright
BY ___
ATTORNEY.

UNITED STATES PATENT OFFICE.

SYRUS WASHINGTON WRIGHT, OF HUFFMAN, ALABAMA.

NUT-LOCK.

SPECIFICATION forming part of Letters Patent No. 517,534, dated April 3, 1894.

Application filed December 16, 1893. Serial No. 493,825. (No model.)

*To all whom it may concern:*

Be it known that I, SYRUS WASHINGTON WRIGHT, a citizen of the United States, residing at Huffman, in the county of Jefferson and State of Alabama, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in nut locks, of that type which are employed on railroad tracks for locking twin nuts on their bolts, and the object of my invention is the provision of a nut lock of simple, durable and inexpensive construction which can be easily applied and detached and which will retain the nuts on the bolts under all circumstances.

The invention consists of a nut lock embodying novel features of construction and arrangement substantially as herein shown, described and specifically claimed.

Figure 1:
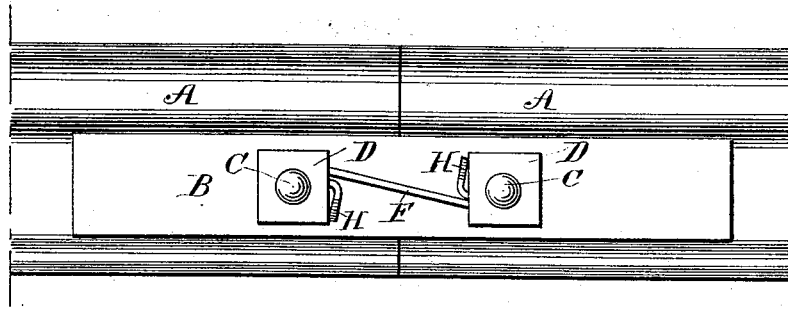
Figure 2:
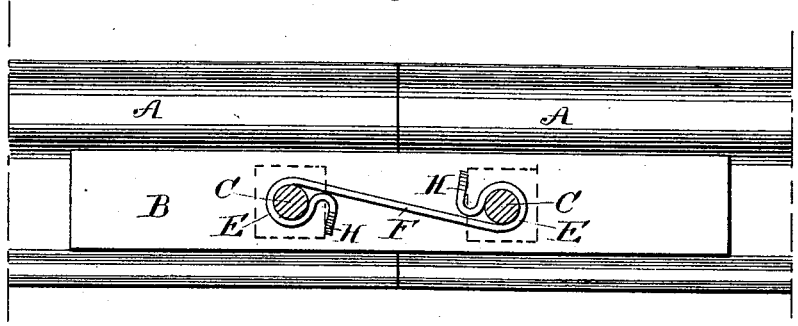
Figure 3:
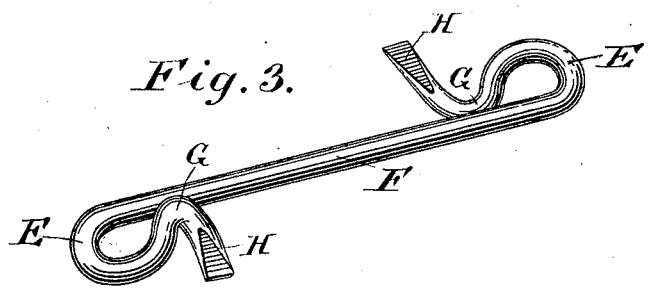

Figure 1 represents a side elevation of my nut lock applied. Fig. 2 represents a similar view with the nut lock in full lines and the nuts in dotted lines to show the location of the parts more clearly, and Fig. 3 is a detail view of the nut lock detached and as it appears for the market or transportation.

In the drawings, A designates the rail, B the fish plates, C the bolts arranged in pairs and passing through the fish plates and D the nuts screwed on the bolts.

My improved nut lock is made from a single piece of steel in the form of a round or square bar which is formed with the end loops E which closely surround the bolts and remain or lie under the nuts and which loops are arranged on the upper and lower side with reference to the central inclined connection F, which brings the loops substantially in line but oppositely arranged with reference to each other. The loops and the central connecting portion are in the same plane and the free ends of the loops are formed with the bends G and the upward extending arms H. These arms are preferably made somewhat thinner than the body of the lock which gives the additional spring or elastic action and when the bolts are in position and the nuts are screwed home they pass over the arms until they are at their desired place and then the arms spring up and bear against the inner faces of the nuts, as clearly shown, and effectively hold the nuts against all strain.

I claim—

The herein described nut lock made from a single piece of metal, consisting of the main or central inclined portion, the loops one at each end adapted to closely surround the bolts, the bends at the open portion of the loops offset on opposite or reverse sides of the loops to give a spring action thereto, and the arms having the tapered or spring ends extending out from the bends and adapted to engage and lock the nuts, said spring arms engaging the inner side of the nuts and being substantially parallel.

In testimony whereof I affix my signature in presence of two witnesses.

SYRUS WASHINGTON WRIGHT.

Witnesses:
R. S. LATIMER,
B. W. TAYLOR.